US011720492B1

(12) United States Patent
Syed et al.

(10) Patent No.: US 11,720,492 B1
(45) Date of Patent: Aug. 8, 2023

(54) ALGORITHMIC TCAM WITH COMPRESSED KEY ENCODING

(71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: DreamBig Semiconductor Inc., San Jose, CA (US)

( * ) Notice: Subject to any disclaimer, the term of this patent is extended or adjusted under 35 U.S.C. 154(b) by 0 days.

(21) Appl. No.: 17/710,678

(22) Filed: Mar. 31, 2022

Related U.S. Application Data (60) Provisional application No. 63/168,921, filed on Mar. 31, 2021.

(51) Int. Cl.
*G06F 12/06* (2006.01)
(52) U.S. Cl.
CPC .... *G06F 12/0646* (2013.01); *G06F 2212/251* (2013.01); *G06F 2212/401* (2013.01)
(58) Field of Classification Search
CPC ........... G06F 12/0646; G06F 2212/251; G06F 2212/401
USPC ..................................... 711/108; 365/49, 50
See application file for complete search history.

(56) References Cited

U.S. PATENT DOCUMENTS

| | | | |
|---|---|---|---|
| 7,643,353 B1 | 1/2010 | Srinivasan et al. | |
| 8,195,873 B2 | 6/2012 | Gazit | |
| 9,094,307 B1 * | 7/2015 | Edsall | H04L 43/106 |
| 9,262,312 B1 * | 2/2016 | Gazit | H04L 45/74591 |
| 9,306,851 B1 * | 4/2016 | Gazit | H04L 45/748 |
| 9,639,501 B1 * | 5/2017 | Gazit | G11C 7/1072 |
| 10,254,968 B1 | 4/2019 | Gazit et al. | |
| 10,318,587 B1 | 6/2019 | Bosshart et al. | |

(Continued)

FOREIGN PATENT DOCUMENTS

| | | |
|---|---|---|
| WO | WO-98/007160 | 2/1998 |
| WO | WO-2007038805 A1 | 4/2007 |

OTHER PUBLICATIONS

RETCAM: An Efficient TCAM Compression Model for Flow Table of OpenFlow by Zhang (Year: 2019).*

(Continued)

*Primary Examiner* — Paul M Knight
(74) *Attorney, Agent, or Firm* — Schwegman Lundberg & Woessner, P.A.

(57) ABSTRACT

A ternary content addressable memory is provided comprising; a memory device that includes a plurality of memory address locations; hash logic operative to determine a hash value, based upon a ternary key, wherein the determined hash value corresponds to a memory address location of the memory device; an encoder operable to convert the ternary key to a binary bit representation; wherein converting includes determining binary mapping bits based upon number and positions of ternary non-X (don't care) value bits of the ternary key; wherein converting further includes determining a different binary data bit to correspond to each different ternary non-X value bit of the ternary key; and memory controller logic to cause the memory device to store the binary bit representation at the memory address location that corresponds to the determined hash value.

15 Claims, 9 Drawing Sheets

(56) References Cited

U.S. PATENT DOCUMENTS

| | | |
|---|---|---|
| 10,778,721 B1 | 9/2020 | Holbrook et al. |
| 10,887,233 B2 | 1/2021 | Labonte et al. |
| 2009/0190404 A1 | 7/2009 | Roohparvar |
| 2013/0242632 A1 | 9/2013 | Wada |
| 2015/0006808 A1 | 1/2015 | Miller et al. |
| 2015/0169467 A1 | 6/2015 | Chase et al. |
| 2017/0040059 A1* | 2/2017 | Arsovski ............... G06F 12/14 |
| 2018/0039662 A1* | 2/2018 | Asai ................. G06F 16/9027 |

OTHER PUBLICATIONS

EE-TCAM: An Energy-Efficient SRAM-Based TCAM on FPGA by Ullah (Year: 2018).*
E-TCAM: An Efficient SRAM-Based Architecture for TCAM by Ullah (Year: 2014).*
A Novel Rule Mapping on TCAM for Power Efficient Packet Classification by Srinivasavarma (Year: 2019).*
Efficient Mapping of Range Classifier into Ternary-CAM by Liu (Year: 2002).*
Encoding Short Ranges in TCAM Without Expansion: Efficient Algorithm and Applications by Barr (Year: 2016).*
BitWeaving: A Non-Prefix Approach to Compressing Packet Classifiers in TCAMs by Meiners (Year: 2011).*
"U.S. Appl. No. 17/710,891, Ex Parte Quayle Action mailed Nov. 25, 2022", 7 pgs.
Demetriades, Socrates, et al., "An Efficient Hardware-basedMulti-hash Scheme for High Speed IP Lookup", Department of Computer Science University of Pittsburg, (Jun. 2008), 8 pages.
Meiners, Chad R., et al., "Algorithmic Approaches to Redesigning TCAM Based Systems", *Sigmetrics*, '08IGMETRICS Jun. 2-6, 2008, Annapolis, Maryland, (Jun. 2008), 2 pgs.
Pagiamtzis, Kostas, et al., "Content-Addressable Memcry (CAM) Circuits and Architectures: A Tutorial and Survey", *IEEE Journal of Solid-State Circuits*, 41(3), (Mar. 2006), 16 pages.
Ravikumar, V. C., et al., "TCAM Architecture for IP Lookup Using Prefix Properties", Published by the IEEE Computer Society 0272-1732/04, (Mar.-Apr. 2004), 10 pages.
Sheu, Jang-Ping, et al., "Efficient TCAM Rules Distribution Algorithms in Software-Defined Networking", *IEEE Transactions on Network and Service Management*, 15(2), (Jun. 2018), 12 pages.
Song, Yibo, et al., "A Low-power Content-Addressable Memory (CAM) Using Pipelined Search Scheme", *ICWET '10: Prcceedings of the International Conference and Workshop on Emerging Trends in Technology*, (Dec. 2009), 6 pages.
Trinh, Nguyen, et al., "Algorithmic TCAM on FPGA with data collision approach", *Indonesian Journal of Electrical Engineering and Computer Science*, (Apr. 2021), 89-96.
"U.S. Appl. No. 17/710,891, Response filed Jan. 18, 2023 to Ex Parte Quayle Action mailed Nov. 25, 2022", 5 pgs.
"U.S. Appl. No. 17/710,891, Notice of Allowance dated Feb. 8, 2023", 8 pgs.
"U.S. Appl. No. 17/710,629, Non Final Office Action dated May 24, 2023", 10 pgs.
"U.S. Appl. No. 17/710,891, Corrected Notice of Allowability dated May 17, 2023", 2 pgs.
Kyungbae, Park, "Resource-Efficient SRAM-Based Ternary Content Addressable Memory Ali Ahmed", Sanghyeon Baeg IEEE Transactions on Very Large Scale Integration (VLSI) Systems Year: 2017 | vol. 25, Issue: 4 | Journal Article | Publisher: IEEE, (Jan. 1, 2017).

* cited by examiner

Fig.1

| KEY | RULE |
|---|---|

|   | 1 | 2 | 3 | 4 | 5 | 6 | 7 | 8 | 9 | 10 |   |
|---|---|---|---|---|---|---|---|---|---|---|---|
| 1 | 0 | 0 | 0 | b0 | b1 | b2 | b3 | b4 | NO X |  | 1 |
| 2 | 0 | 0 | 1 | 0 | b1 | b2 | b3 | b4 | b0 IS X |  | 2 |
| 3 | 0 | 0 | 1 | 1 | b0 | b2 | b3 | b4 | b1 IS X |  | 3 |
| 4 | 0 | 1 | 0 | 0 | b0 | b1 | b3 | b4 | b2 IS X |  | 4 |
| 5 | 0 | 1 | 0 | 1 | b0 | b1 | b2 | b4 | b3 IS X |  | 5 |
| 6 | 0 | 1 | 1 | 0 | b0 | b1 | b2 | b3 | b4 IS X |  | 6 |
| 7 | 0 | 1 | 1 | 1 | 0 | b2 | b3 | b4 | b0, b1 X |  | 7 |
| 8 | 0 | 1 | 1 | 1 | 1 | b0 | b1 | b4 | b0, b2 X |  | 8 |
| 9 | 1 | 0 | 0 | 0 | 0 | b1 | b2 | b4 | b0, b3 X |  | 9 |
| 10 | 1 | 0 | 0 | 0 | 1 | b1 | b2 | b3 | b0, b4 X |  | 10 |
| 11 | 1 | 0 | 0 | 1 | 0 | b0 | b3 | b4 | b1, b2 X |  | 11 |
| 12 | 1 | 0 | 0 | 1 | 1 | b0 | b2 | b4 | b1, b3 X |  | 12 |
| 13 | 1 | 0 | 1 | 0 | 0 | b0 | b2 | b3 | b1, b4 X |  | 13 |
| 14 | 1 | 0 | 1 | 0 | 1 | b0 | b1 | b4 | b2, b3 X |  | 14 |
| 15 | 1 | 0 | 1 | 1 | 0 | b0 | b1 | b3 | b2, b4 X |  | 15 |
| 16 | 1 | 0 | 1 | 1 | 1 | b0 | b1 | b2 | b3, b4 X |  | 16 |

*Fig. 7A*

| | 1 | 2 | 3 | 4 | 5 | 6 | 7 | 8 | 9 | 10 | |
|---|---|---|---|---|---|---|---|---|---|---|---|
| | 1 | 1 | 0 | 0 | 0 | 0 | b0 | b1 | b0, b1 | NOT X | 17 |
| | 1 | 1 | 0 | 0 | 0 | 1 | b0 | b2 | b0, b2 | NOT X | 18 |
| | 1 | 1 | 0 | 0 | 1 | 0 | b0 | b3 | b0, b3 | NOT X | 19 |
| | 1 | 1 | 0 | 0 | 1 | 1 | b0 | b4 | b0, b4 | NOT X | 20 |
| | 1 | 1 | 0 | 1 | 0 | 0 | b1 | b2 | b1, b2 | NOT X | 21 |
| | 1 | 1 | 0 | 1 | 0 | 1 | b1 | b3 | b1, b3 | NOT X | 22 |
| | 1 | 1 | 0 | 1 | 1 | 0 | b1 | b4 | b1, b4 | NOT X | 23 |
| | 1 | 1 | 0 | 1 | 1 | 1 | b2 | b3 | b2, b3 | NOT X | 24 |
| | 1 | 1 | 1 | 0 | 0 | 0 | b2 | b4 | b2, b4 | NOT X | 25 |
| | 1 | 1 | 1 | 0 | 0 | 1 | b3 | b4 | b3, b4 | NOT X | 26 |
| | 1 | 1 | 1 | 0 | 1 | 0 | b0 | X | b0, NOT X | | 27 |
| | 1 | 1 | 1 | 0 | 1 | 1 | b1 | X | b1, NOT X | | 28 |
| | 1 | 1 | 1 | 1 | 0 | 0 | b2 | X | b2, NOT X | | 29 |
| | 1 | 1 | 1 | 1 | 0 | 1 | b3 | X | b3, NOT X | | 30 |
| | 1 | 1 | 1 | 1 | 1 | 0 | b4 | X | b4, NOT X | | 31 |
| | 1 | 1 | 1 | 1 | 1 | 1 | X | X | ALL X | | 32 |

ALGORITHMIC TCAM WITH COMPRESSED KEY ENCODING

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name a few examples. Many network devices (e.g., bridges, switches, routers, gateways, network proxies), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted. Algorithmic RAM-based TCAM typically uses two-bit values stored in RAM to represent individual ternary states. In other words, each of TCAM logic 0, logic 1, and X often is represented in RAM-based TCAM as a different combination of two binary bits. TCAMs have suffered from large use of resources. There is a need to reduce resources required for TCAM.

SUMMARY

In one aspect, a ternary content addressable memory is provided that includes an interface to receive a ternary key, an integrated circuit memory device that includes a plurality of memory address locations, and hash logic. The hash logic is operative to determine a hash value based upon a ternary key received at the interface, and the determined hash value corresponds to a memory address location of the memory device. An encoder logic is operable to convert the ternary key that includes at least five ternary value bits, to a binary bit representation. The encoder logic determines binary mapping bits based upon number and positions of ternary non-X (don't care) value bits of the ternary key. The encoder logic also determines a different binary data bit to correspond to each different ternary non-X value bit of the ternary key, wherein each determined binary data bit has a logic value that matches a logic value of the ternary value bit to which the determined binary data bit corresponds. Memory controller logic causes the memory device to store the binary bit representation at the memory address location that corresponds to the determined hash value.

In another aspect, a ternary content addressable memory is provided that includes an interface to receive a ternary keys and a memory device that includes a plurality of memory address locations. The memory device stores, at a first memory address location, an encoded key that includes three or more binary value mapping bits that indicate position and number of ternary non-X (don't care) value bits within a previous ternary key and that includes zero or more binary value data bits that each corresponds to and matches a logical value of a different ternary non-X value bit of the previous ternary value. Hash logic is operative to determine hash values based upon the received ternary keys, wherein the hash values correspond to memory address locations of the memory device. Memory controller logic is operative to cause the memory device to output the encoded key from the memory address location in response to a hash value determined based upon a later ternary key, on a condition that the determined hash value corresponds to the first memory location. A decoder is operable to determine correspondences between the non-X ternary value bits in the later ternary key and the binary value data bits in the outputted binary encoded key, based upon the binary value mapping bits in the binary encoded key. A comparator is operable to compare the non-X ternary value bits in the later ternary key with binary value data bits determined to correspond to the non-X ternary value bits in the later ternary key and to provide one or more comparator results.

In another aspect, a method is provided to control a ternary content addressable memory that includes a memory device that includes a plurality of memory address locations. A ternary key is received. A hash value is determined based upon the received ternary key. The determined hash value corresponds to a memory address location of the memory device. The received ternary key, which includes at least five ternary value bits, is converted to a binary bit representation. Converting includes determining binary mapping bits based upon number and positions of ternary non-X (don't care) value bits of the ternary key. Converting also includes determining a different binary data bit to correspond to each different ternary non-X value bit of the ternary key, wherein each determined binary data bit has a logic value that matches a logic value of the ternary value bit to which the determined binary data bit corresponds. The memory device is caused to store the binary bit representation at the memory address location that corresponds to the determined hash value.

In another aspect, a method is provided to control a ternary content addressable memory that includes a memory device that includes a plurality of memory address locations. An encoded key is stored at a first memory location. The encoded key includes three or more binary value mapping bits that indicate position and number of ternary non-X (don't care) value bits within a previous ternary key and includes zero or more binary value data bits that each corresponds to and matches a logical value of a different ternary non-X value bit of the previous ternary value. A hash value is determined based upon a later ternary key. The encoded key is output from the first memory address location in response to the determined hash value on a condition that the hash value corresponds to the first memory location. Correspondences between the non-X ternary value bits in the later ternary key and the binary value data bits in the outputted binary encoded key are determined based upon the binary value mapping bits in the binary encoded key. A determination is made as to whether the non-X ternary value bits in the later ternary key match binary value data bits determined to correspond to the non-X ternary value bits in the later ternary key.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Overview:

An algorithmic ternary (3-state) content addressable memory (TCAM) encodes ternary keys for storage to and retrieval from a binary (2-bit state) memory device using fewer than two binary bits per ternary value bit. A ternary key includes a sequence of ternary bits. The algorithmic TCAM uses mapping bits to indicate ternary bit positions having X values, thereby eliminating the need to represent X values in an encoded binary representation. This approach reduces the number of 2-state binary bits required to represent a sequence of 3-state ternary bits.

Figure 1:
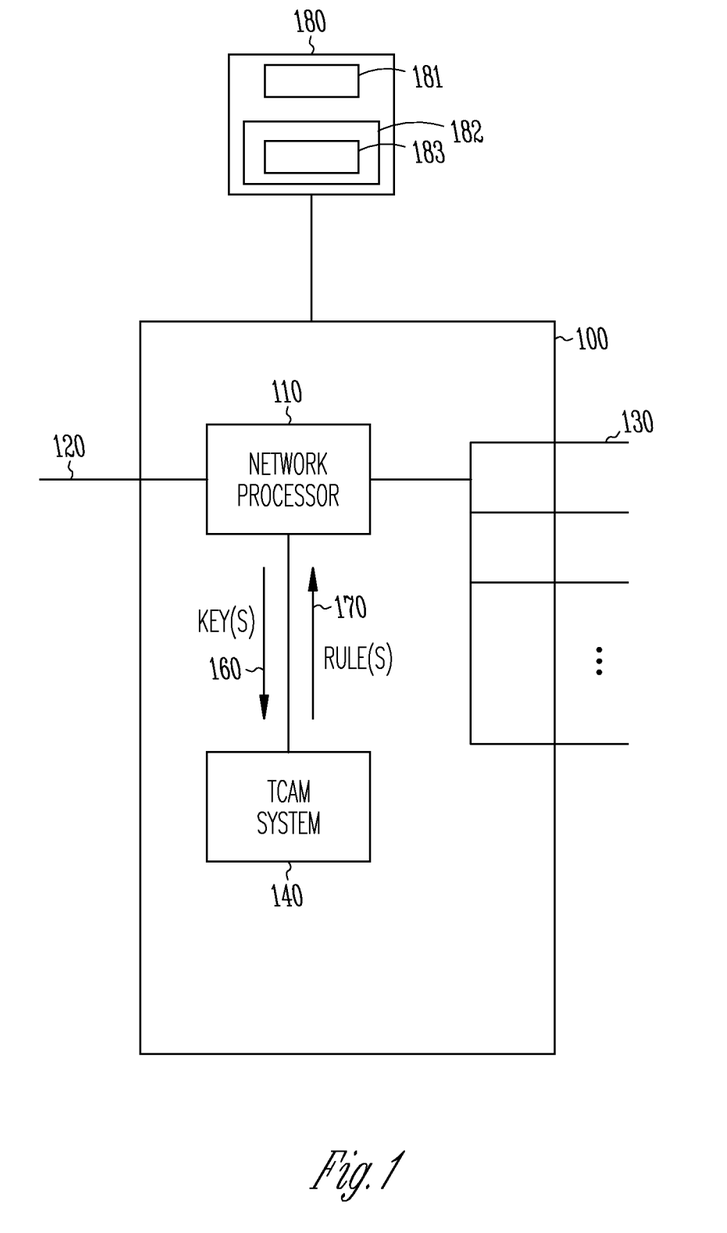
FIG. 1 is an illustrative drawing showing an example network device in accordance with some embodiments.

Network Device:

FIG. 1 is an illustrative drawing showing an example network device 100. The network device 100 can include one or more integrated circuit (IC) devices, a larger device, such as a router or switch, or a combination of these. In some implementations, the network device 100 is coupled with a central processing unit (CPU) 180 of a network communications apparatus. The computing machine 180 can include multiple processor circuits 181 coupled to non-transitory memory 182 that includes instructions 183 to configure the computing machine 180 to perform operations described herein. In some implementations, the network device 100 is a network communications apparatus and includes the CPU 180. The network device 100 can be coupled with a computer network, such as a local area network (LAN) or a wide area network (WAN), and processes data packets that comprise ordered sequences of binary data values.

The network device 100 includes a network processor device 110, which receives the packets or portions of packets on an input port or interface 120. The network processor 110 parses incoming packet information to identify relevant data fields that provide information for handling network operations, such as routing and forwarding. The network processor 110 can be coupled with a TCAM-based network rules search engine 140, hereinafter referred to as the "TCAM system" 140, which assists in determining appropriate actions to take in response to receipt of packets over a network. The network processor 110 extracts information from the packets, referred to as key information 160. The key information is used to identify rules that determine appropriate actions to take in response to the received packets. The key information represents data bits within a packet that indicate packet information such as network addresses or portions thereof, port numbers, other header and trailer information, or combinations thereof, for example. The network processor 110 can generate key information, also referred as a "keys", that uses ternary value bits, which can have any of three states, logic 0, logic 1, or X ("don't care"), to represent the binary bits extracted from a packet. In general, ternary value bits within a key that have a logic value 0 or a logic value 1 contribute to identifying a rule that determines an action to take based upon a packet represented by the key, and ternary value bits within a key that have an X state do not contribute to identifying a rule that determines an action take based upon the packet represented by the key.

Figure 2:
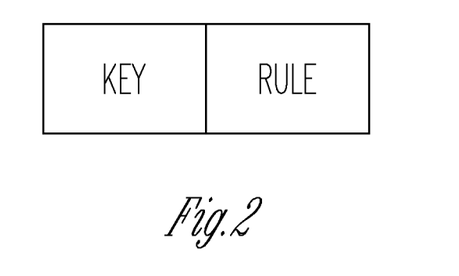
FIG. 2 is an illustrative drawing representing an example record that includes a key and an associated rule searched based upon the key.

The network processor 110 sends ternary key information 160 to the TCAM system 140, which stores rules associated with such key information that indicate corresponding action to take. In response to receipt of key information 160 corresponding to a packet, the TCAM system 140 returns one or more corresponding rules 170 identified using the key information 160. The network processor 110 determines actions to take based on the returned one or more rule 170. Such actions can include outputting a packet on a selected output port or interface 130 or dropping a packet, as appropriate, for example. The TCAM system 140 includes one or more memory devices to store keys in association with corresponding rules 170. Matches between previously stored keys and keys provided by the network processor 110, in response to received packets, are searched to identify rules to use to route or switch the received packets. FIG. 2 is an illustrative drawing representing an example record, stored in a memory device, that includes a key and an associated rule searched based upon the key.

Figure 3:
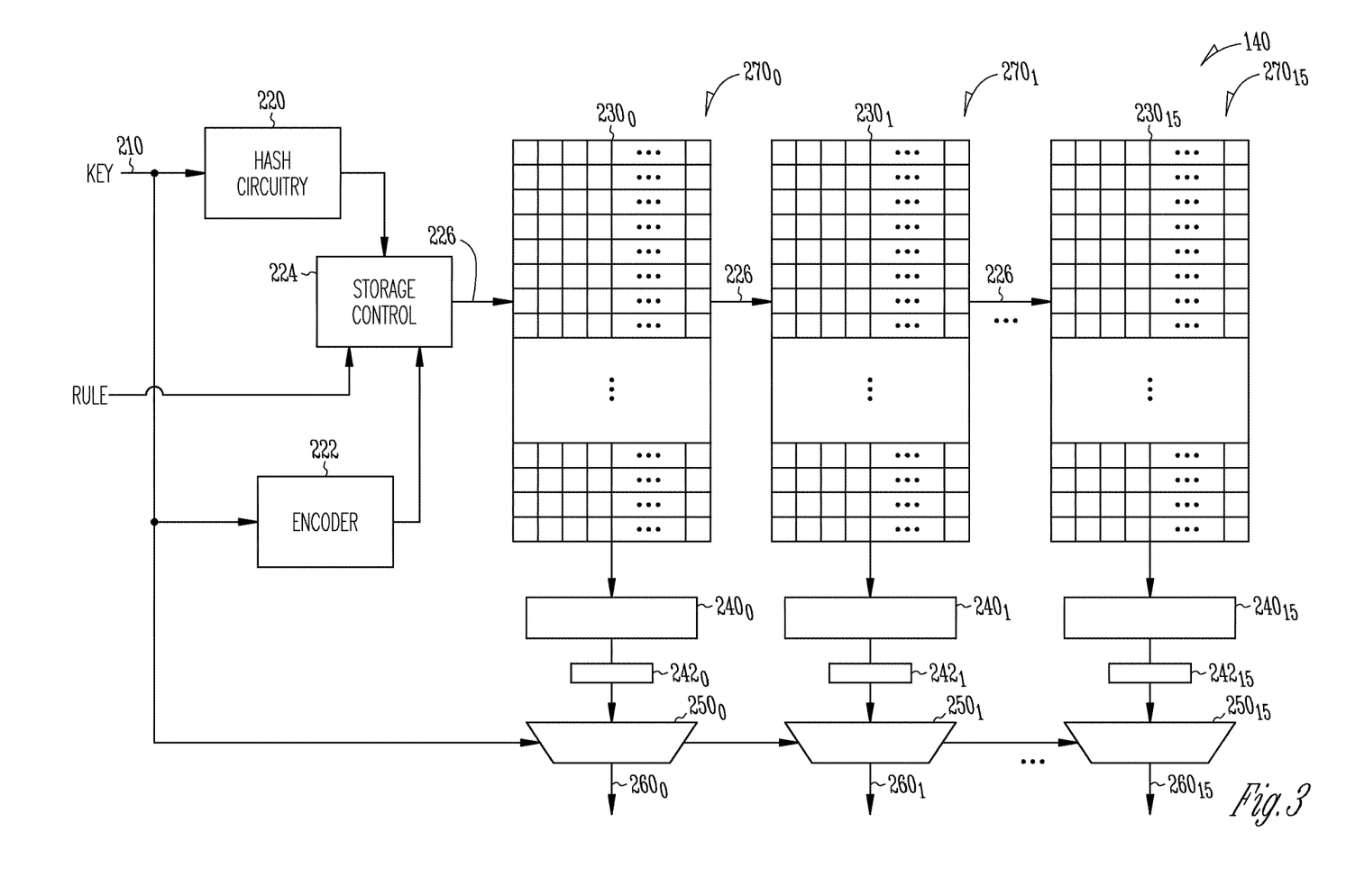
FIG. 3 is an illustrative drawing showing an example of network search engine that includes algorithmic TCAM, implemented using RAM.

TCAM System:

FIG. 3 is an illustrative drawing showing an example a network search engine 140 that includes an algorithmic TCAM 200 implemented using RAM in accordance with some embodiments. In some implementations, the TCAM 200 is included in the network search engine 140 of FIG. 1. The TCAM 200 includes an input interface 210 on which a ternary search key is received, hash logic 220, an encoder logic circuit 222, and multiple memory devices 230. The memory devices $230_1$-$230_{15}$ can include RAM memory devices of various types, such Static RAM (SRAM), Dynamic RAM (DRAM), Synchronous DRAM (SDRAM), Flash RAM, etc. For example, each memory device 230 can be a 512×256 RAM. In addition, each memory device $230_1$-$230_{15}$ can have an associated buffer 240, decoder logic circuit 242, and comparator 250. Each memory device $230_1$-$230_{15}$ and its associated buffer 240, decoder 242, and comparator 250 can be viewed as a memory device module 270. The number of memory device modules 270 employed in the TCAM 200 (e.g., one, two, four, eight, sixteen, etc.) can vary with implementation. The hash logic 220 can be implemented in hardware or software. For instance, an example TCAM 200 can use the computing machine 180 encoded with instructions 183 to implement the hash logic 220. The hash logic 220 is operable during a data write operations to determine hash values used to determine address locations at which to store keys in association with rules within one or more of the multiple memory devices 230. The hash logic 220 is operable during data read operations, to read keys and associated rules from one or more of the multiple memory devices 230 where they are stored.

The hash logic 220 uses a mathematical hash function to determine hash values based upon one or more ternary bits within key values received at the interface 210. The determined hash values correspond to memory addresses in the memory devices $230_1$-$230_{15}$. The hash logic 220 receives a key as input at interface 210, which can include a buffer (not shown) to temporarily store a received ternary key, and based upon the received key, generates a value referred to as a hash value or hash that is used to determine a common memory address location present within each of the memory devices $230_1$-$230_{15}$. Hash functions are well known to persons of ordinary skill in the art.

More particularly, during a data write operation, the hash logic 220 receives a ternary key provided by the network processor 110 and uses a hash function to determine a hash value corresponding to the received key. The TCAM 200 includes memory controller logic circuitry 224 to manage the flow of data going to and from the memory devices $230_0$-$230_{15}$. The memory controller logic 224 determines control signals to provide on storage control lines 226, based upon the hash values, to cause storing of encoded keys at memory address locations within the memory devices $230_1$-$230_{15}$. The memory control logic 224 also can cause a rule, indicated by the network processor 110 as corresponding to a key, to be stored in the memory device in association with the key, at a memory address determined for the key as illustrated in FIG. 2. The memory control logic 224 controls access to the memory devices based upon hash value determined for a received key. As shown in FIG. 3, a single line identifier can identify corresponding common memory address locations in multiple memory devices 230.

The encoder 222 encodes the key information from a ternary key representation to an encoded key representation that uses binary data bits suitable for storing within the memory devices 230. Table 1 shows ternary value bits of a key and corresponding binary data bit values used to represent the ternary value bits in a memory device 230.

TABLE 1

| Ternary Value Bits | Binary Value Bits |
|---|---|
| 0 | 0 |
| 1 | 1 |
| X | None |

It is noted that a one-bit ternary logic 0 value is mapped to a corresponding one-bit binary logic 0 value and that a one-bit ternary logic 0 value is mapped to a corresponding one-bit binary logic 1 value and that a ternary X state value is not mapped and is removed. Thus, instead of using two binary bits to represent each ternary bit, which is conventional, only one binary bit is used to represent each ternary bit. The encoder 222 compresses the key information by excluding X values from the encoded version of the key. The encoder 162 generates mapping bits, described below, to indicate correspondence between binary data bits within the encoded representation and ternary value bits within the ternary key from which the encoded key is derived.

During a read operation, the TCAM 200 receives a ternary key at the key interface 210. As explained above, a ternary key can correspond to relevant fields of a packet received over a network by a network processor 110 and can include logic zero (0) values, logic one (1) values, and don't care (X) values. For example, the key can include ternary value bits sequences that represent one or more of an internet protocol (IP) address, a socket number, a protocol, a multiprotocol label switching (MPLS) label, or virtual routing and forwarding (VRF) data. The hash logic 220 produces a hash value that correspond to the received key. The memory control logic 224 determines signals to provide on storage control lines 226, based upon the hash value, to cause one or more of the memory devices to output to their one or more associated buffers 240 an encoded key and an associated rule stored at the determined memory address at the one or more memory devices. Associated decoders 242 at one or more memory devices decode the encoded keys outputted at one or more of the memory devices to identify binary data bit values to be compared with corresponding bits of the received ternary key. Associated comparators 250 at one or more memory devices compare binary data bit values outputted at one or more of the memory devices with corresponding ternary value bits of the received ternary key to identify a match.

As explained below, the binary data bits can occupy different bit locations in different encoded keys. The binary data bits within any given encoded key are indicated by mapping bits within the encoded key. A comparator 250 produces a match indication signal at a corresponding line 260 based upon a comparison identifying a match between a stored encoded key value and a received ternary key. These comparison operations can be performed in parallel at different memory device modules 270, and match indication signals on lines 260 can indicate whether a match was found for the search key in one or more respective memory devices $230_1$-$230_{15}$. In response to determining a match, a comparator causes 250 causes a rule associated with the matching key to be returned to the network processor 110 for use in taking a corresponding action.

Figure 4:
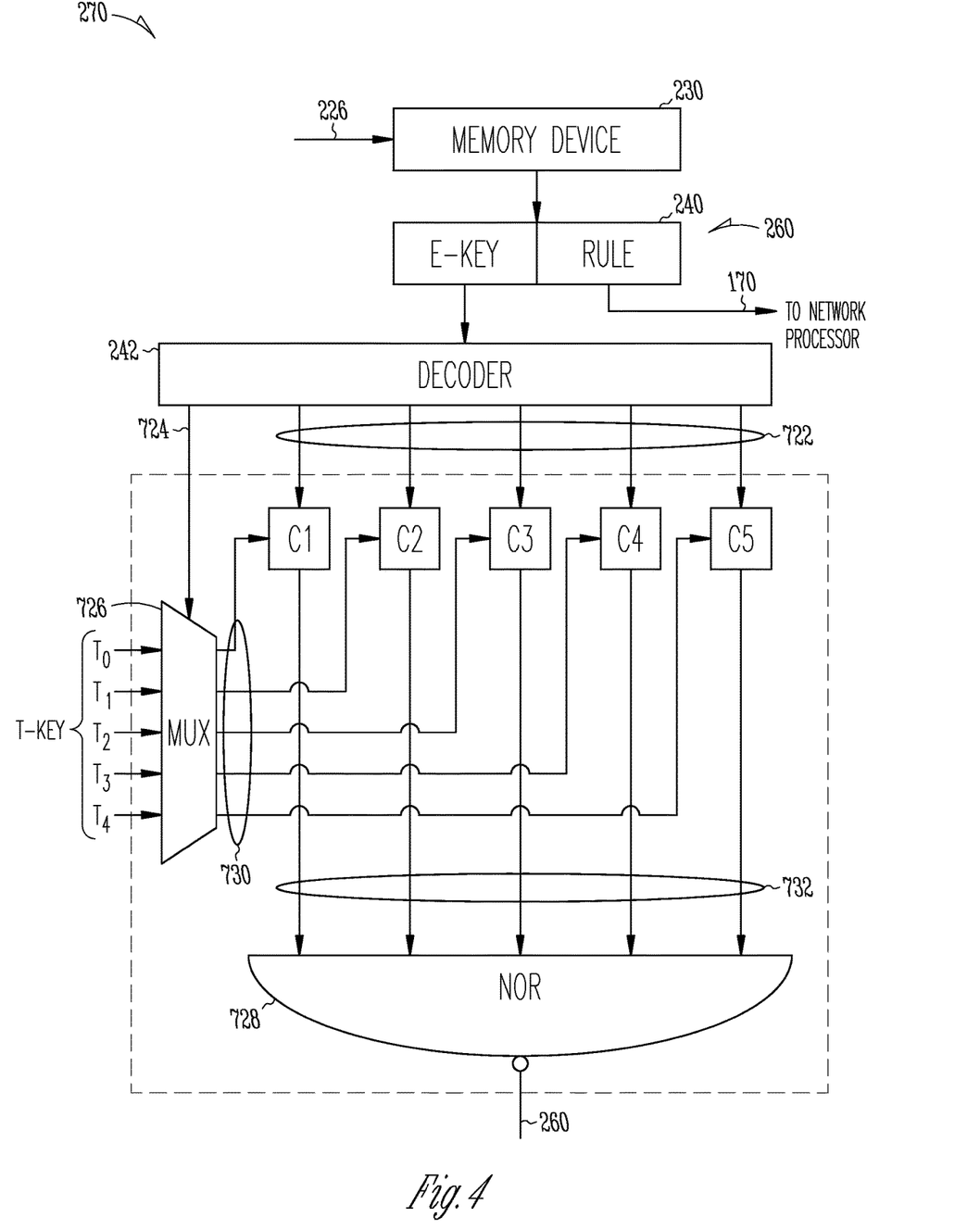
FIG. 4 is an illustrative drawing showing certain details of an example buffer, decoder, and comparator of an example memory device module.
Figure 5A:
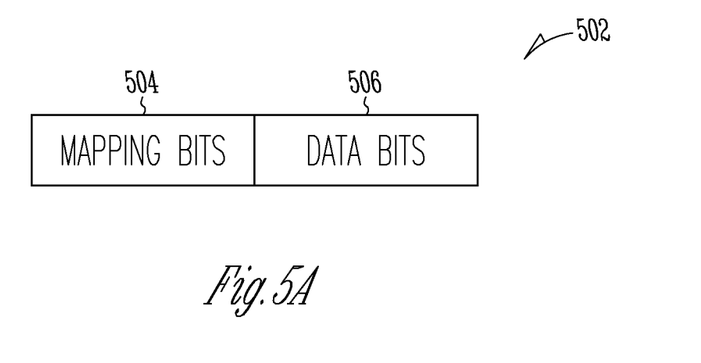
FIG. 5A is an illustrative drawing representing an example encoded key that can be stored in a memory device.
Figure 5B:
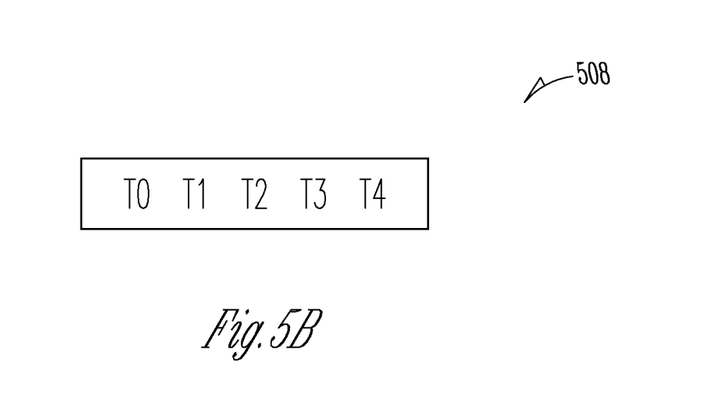
FIG. 5B is an illustrative drawing representing an example ternary key.

Memory Device Module:

FIG. 4 is an illustrative drawing showing certain additional details of an example memory device module 270 that includes a memory device 230, buffer 240, decoder 242, and comparator 250 of an example memory device module 270 in accordance with a contemplated embodiment. During a read operation, a memory device 230 is configured to output an encoded binary value key (an "E-key") and a corresponding rule stored at an address location indicated by one or more signals on storage control lines 226. The decoder 242 decodes the E-key. The example decoder 242 is configured to decode an encoded binary value key (an "E-key") for comparison with a received multi-bit ternary key (a "T-key"). FIG. 5A is an illustrative drawing representing an example binary value E-key 502 that can be stored in a memory device 230. The example E-key 502 has a fixed-size field size that includes a variable size mapping bits field 504 and a variable size binary data bits field 506. FIG. 5B is an illustrative drawing representing an example five-bit T-key 508 (a "5T key") that includes ternary bits T0, T1, T2, T3, and T4 and that is received after the E-key is stored.

Figure 6:
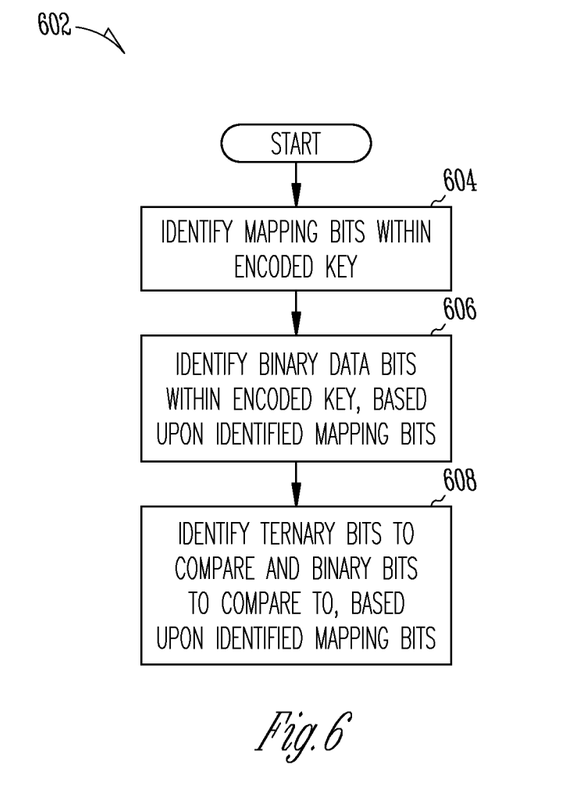
FIG. 6 is an illustrative flow diagram showing example operations performed by an example decoder.

Decoder:

FIG. 6 is an illustrative flow diagram 602 showing example operations performed by an example decoder 242 in concert with a read operation in accordance with some embodiments. The example encoder 242 can be implemented in hardware logic or using the computing machine 180 and stored instructions, for example. Operation 604 identifies mapping bits within a previously stored E-key. Different bits can act as mapping bits in different E-keys. Operation 606 identifies binary bits within an E-key and provides the identified binary data bits as output at one or more of output lines 722, based upon the identified mapping bits. Data bits can be outputted on different output lines for different E-keys. Operation 608 identifies ternary bits to compare with binary data bits, determines which binary bits to map them to, and provides a corresponding selection signal on line 724 to select the identified ternary bits and the comparisons to make, based upon the identified mapping bits. Different ternary bits can be selected for comparison for different E-keys.

Comparator:

An example comparator 250 includes a multiplex selector circuit 726, five (5) two-bit comparator circuits C0, C1, C2, C3, and C4, and a NOR logic circuit 728. The multiplex circuit is coupled to receive the selection signal on line 724 and to receive five (5) ternary key values T0-T4 of a later received ternary key value 508 as ternary data inputs. The multiplexor 726 is configured to selectably provide individual ones of the ternary value bits T0-T4 on lines 730 to selectable ones of comparator circuits C1-5, based upon the selection signal on line 724. In an example comparator 250, it is contemplated that different ternary bits may be compared at different comparator circuits, based upon the identified mapping bits. The comparator circuits C0-C4 are coupled to receive binary data bits provided on lines 722 by the decoder 742 and to receive ternary data bits provided on lines 730 by the multiplexer 726. The comparator circuits C0-C4 are configured to respectively compare received binary data bits with received ternary value bits and to produce respective comparison result signals on lines 732. In an example comparator 250, the comparison circuits output a comparison value having a logic 0 value in response to a match between a received binary data value bit and a received ternary value bit. The NOR logic circuit 728 produces a match indication signal on line 260 indicating whether each of comparator circuits C0-C4 that performs a comparison, produces a comparison value that indicates a match. In an example comparator 250, it is contemplated that different combinations of comparator circuits may used perform comparisons for different E-keys, based upon the identified mapping bits.

Figure 7A:
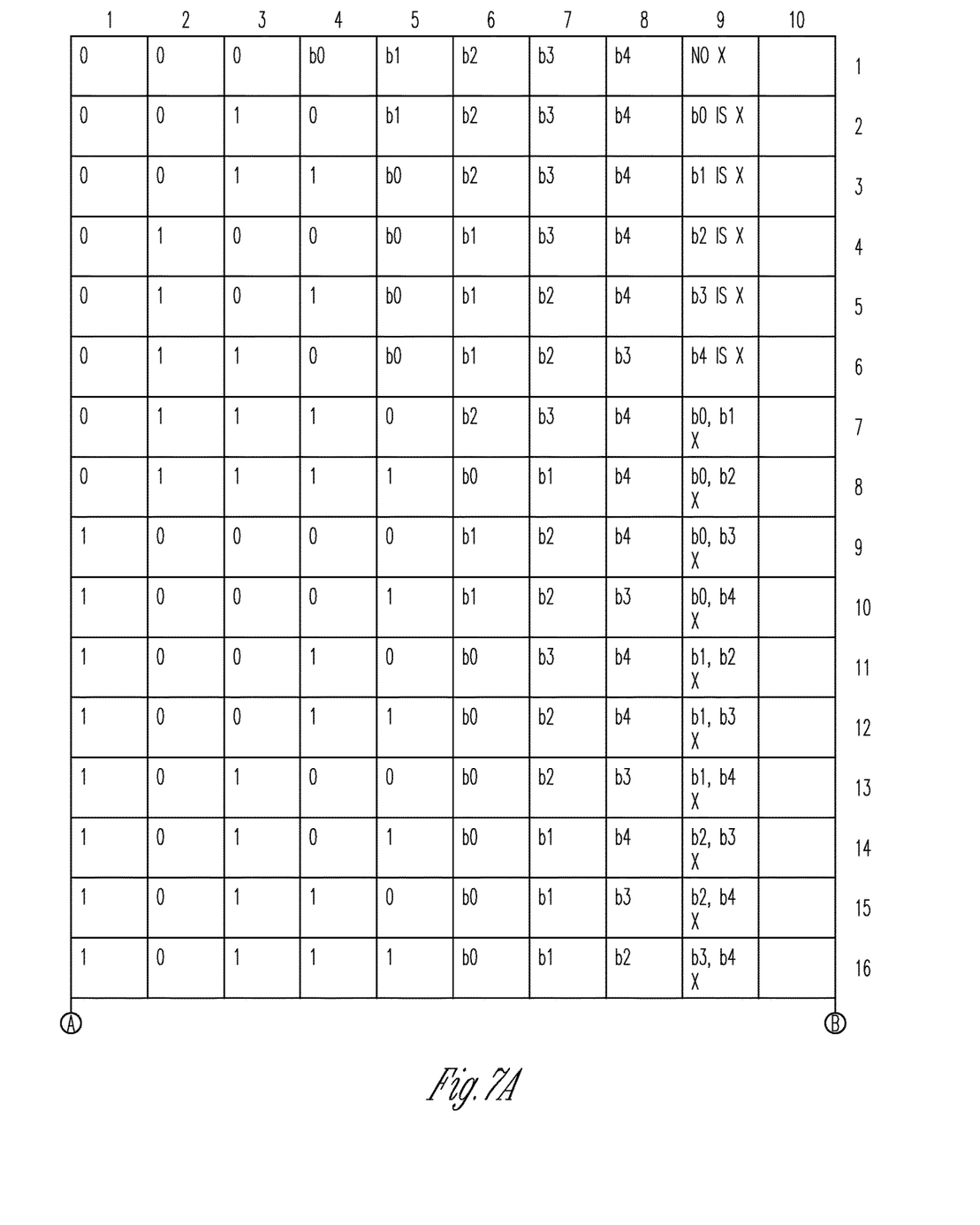
FIGS. 7A-7B show an illustrative example encoding table representing an example configuration of an encoder.
Figure 7B:
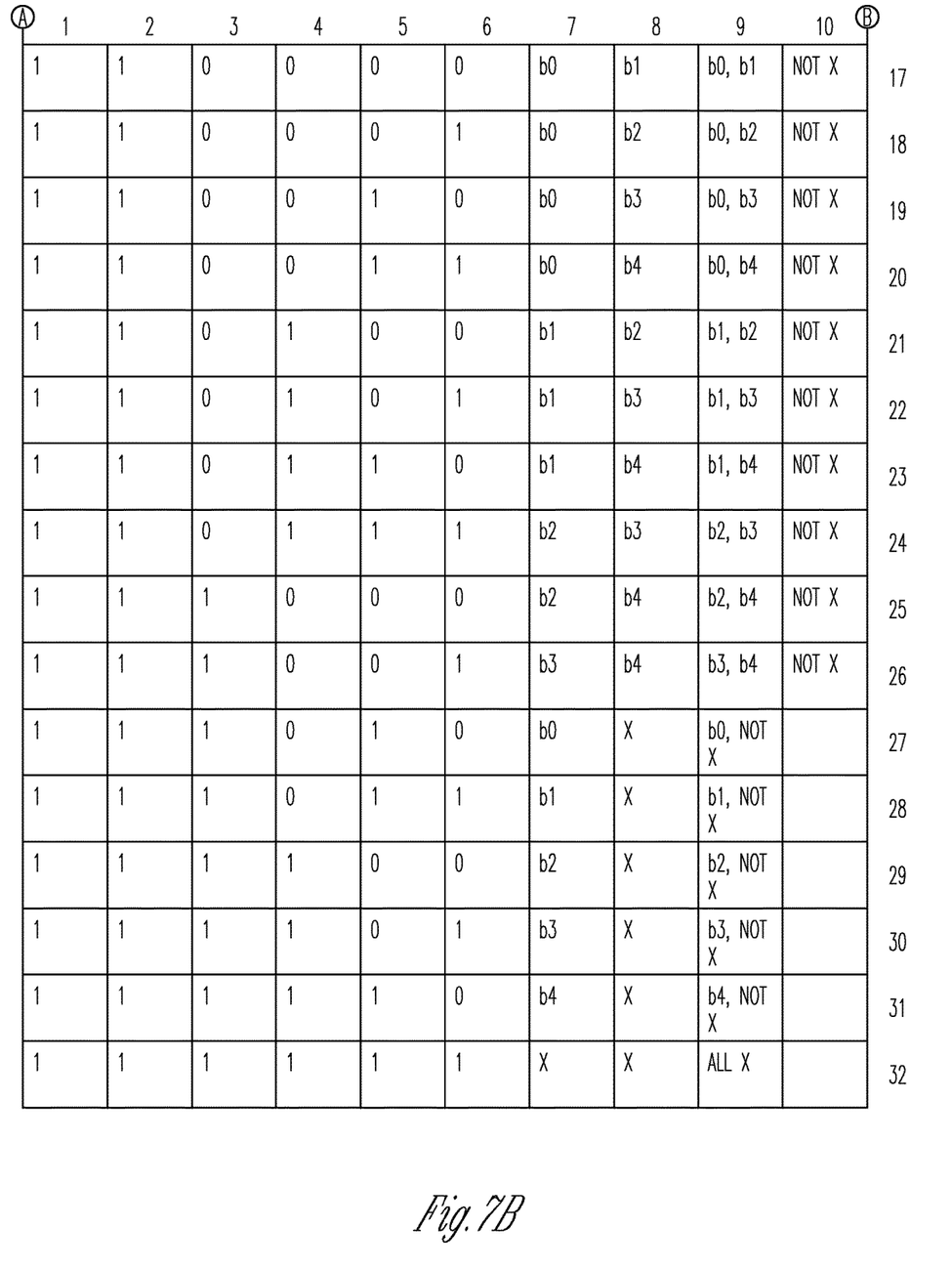

Encoder:

FIGS. 7A-7B show an illustrative example encoding Table 2 representing an example configuration of encoder 222 in accordance with some embodiments. The example Table 2 shows an example encoding from of a five-ternary value bit ("5T") sequences to eight-bit binary sequences. Each of the five ternary value bits (T0, T1, T2, T3, T4) can have any one of three possible values (0, 1, or X). Thus, there are $3^5=243$ different possible ternary value bit combinations for a 5T sequence. Each binary bit can have a value of logic 0 or logic 1, and therefore, there are $2^8=256$ different possible eight-bit sequences. Each encoded eight-bit sequence includes multiple binary mapping bits and zero or more binary data bits. The mapping bits map logic 0 valued ternary value bits and logic 1 valued ternary value bits to binary data bits. Although the encoded mapping bits do not include mappings of ternary X's to binary data values, the mapping bits indicate positions of ternary X's within 5T sequences.

Each different row of the encoding table represents logic circuitry to encode 5T sequences having ternary X's in different positions. Stated differently, each row represents encoding logic circuitry to encode a 5T sequence having a unique combination of number and position(s) of ternary X's.

Mapping bits are represented in Table 2 as binary values, 0 or 1. Binary data bit values are represented in Table 2 as b0, b1, b2, b3, and b4. Each binary data bit corresponds to a different ternary value bit. Binary data bit b0 corresponds to ternary value bit T0. If T0 is logic 0, then b0 in encoded in Table 2 as logic 0. If T0 is logic 1, then b0 is encoded in the Table 2 as logic 1. Binary data bits b1-b4 are similarly encoded. Binary data bit b1 corresponds to ternary value bit T1. Binary data bit b2 corresponds to ternary value bit T2. Binary data bit b3 corresponds to ternary value bit T3. Binary data bit b4 corresponds to ternary value bit T4.

Row 1 represents a 5T sequence with no ternary X's. Rows 2-6 represent 5T sequences with one ternary X. Rows 7-16 represent 5T sequences with two ternary X's. Rows 17-26 represent 5T sequences with three ternary X's. Rows 27-31 represent 5T sequences with three ternary X's. Row 32 represents a 5T sequence of all ternary X's.

Figure 8:
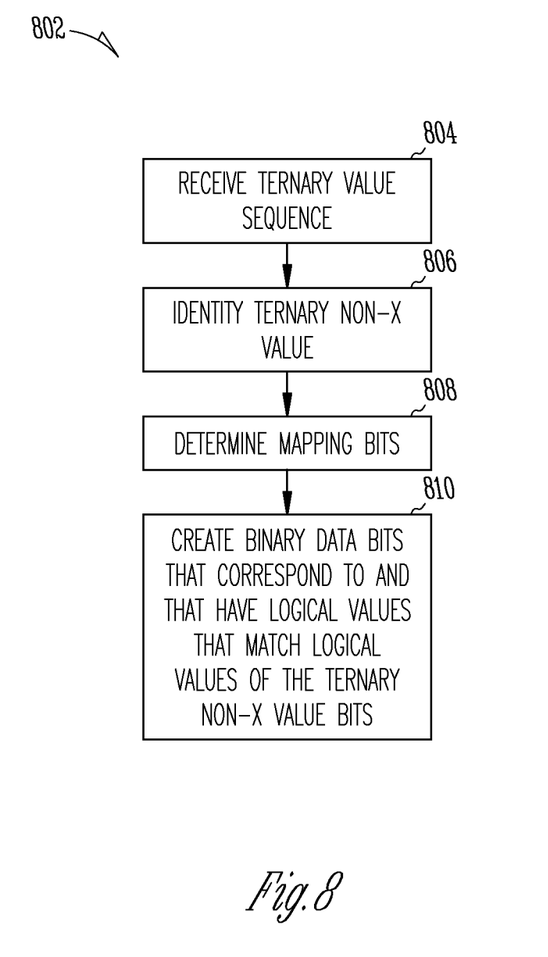
FIG. 8 is an illustrative flow diagram showing example operations performed by an example encoder.

FIG. 8 is an illustrative flow diagram 802 showing example operations performed by an example encoder 222 in concert with a write operation in accordance with some embodiments. The example encoder 222 can be implemented in hardware logic or using the computing machine 180 configured with stored instructions, for example. Operation 804 receives a ternary key, which includes a multiple ternary value bit sequence T0-T4. Operation 806 identifies ternary non-X value bits in the received ternary key. In an example encoder 222, operation 806 parses the ternary key sequence T0-T4 to locate ternary non-X value bits. Operation 808 determines a unique sequence of binary mapping bits that indicates a position of each ternary non-X value bit of the received ternary sequence. Operation 810 determine zero or more binary data bits, in which each binary data bit corresponds to a ternary non-X value bit of the received ternary sequence, and in which each determined binary data bit has a logic value that matches a logic value of the ternary non-X value bit that corresponds to the binary data bit. Moreover, an example operation 810 arranges the determined binary data bits in an ordered sequence of positions that corresponds to an order of ternary sequence positions of the ternary non-X value bits to which binary data bits correspond.

The memory control logic 224 produces control signals on storage control lines 226 that cause storage of an encoded version of the received ternary key, which includes the determined mapping bits and the corresponding binary data bits, in a memory device 230 at an address location determined, based on a hash value, which is determined by the hash circuitry 220, based upon the received ternary key.

The example encoding Table 2 includes eight columns, numbered 1-8, and thirty-two rows, numbered 1-32. The Table 2 includes an additional two columns numbered 9-10 that provide annotations indicating whether particular binary data bits correspond to ternary 5T X's. The annotations are not part of the encoding.

Row 1 represents encoder logic to encode a 5T value on the condition that there are no X values in the 5T value being encoded. In row 1, three (3) mapping bits occupy columns 1-3 and five (5) binary data bits occupy columns 4-8, in row 1. Columns 4-8 of row 1 shows positions of binary data bits b0-b4 on the condition that there are no X values in the 5T value being encoded. It will be appreciated that in the example encoder 222 positions binary bits b0-b4 in an ordering that matches ordering of ternary value bits T0-T4 to which they correspond.

Rows 2-6 represent encoder logic to encode on a 5T value on the condition that there is one X value in a 5T value being encoded. Each different one of rows 2-6 represents the one X value being located at a different position in the 5T value. A different combination of four (4) mapping bits occupies each of columns 1-4 and a different combination of four (4) binary data bits occupies columns 5-8, in each of rows 2-6. Columns 5-8 of each of rows 2-6 shows a different possible combination of binary data bits corresponding to the non-X-valued ternary bits of a 5T value that has one X value. Referring to row 5, for example, it will be appreciated that in the example encoder 222 positions binary bits b0, b1, b2, and b4 in an ordering that matches ordering of ternary value bits T0, T1, T2, and T4 to which they correspond.

Rows 7-16 represent encoder logic to encode on a 5T value on the condition that there are two X values in a 5T value being encoded. Each different one of rows 7-16 represents the two X values being located at different positions in the 5T value. A different combination of five (5) mapping bits occupies each of columns 1-5 and a different combination of binary data bits occupies each of columns 6-8, in each of rows 7-16. Columns 6-8 of each of rows 7-16 shows a different possible combination of binary data bits corresponding to the non-X-valued ternary bits of a 5T value that has two X values.

Rows 17-26 represent encoder logic to encode on a 5T value on the condition that there are three X values in a 5T value being encoded. Each different one of rows 17-26 represents the three X values being located at different positions in the 5T value. A different combination of six (6) mapping bits occupies each of columns 1-6 and a different combination of two (2) binary data bits occupies columns 7-8, in each of rows 17-26. Columns 6-8 of each of rows 17-26 shows a different possible combination of binary data bits corresponding to the non-X-valued ternary bits of a 5T value that has three X values.

Rows 27-31 represent encoder logic to encode on a 5T value on the condition that there are four X values in a 5T value being encoded. Each different one of rows 27-31 represents the four X values being located at different positions in the 5T value. A different combination of six (6) mapping bits occupies each of columns 1-6, and a different one (1) of binary data bit occupies column 7, in each of rows 27-31. Column 7 of each of rows 27-31 shows a different possible binary data bit corresponding to non-X-valued ternary bits of a 5T value that has four X values.

Example Encodings Based Upon the Example First Encoder:

If "No X" and 5T=10111, then the encoding is 00010111

If "One X" and 5T=10111 and T0 is X, then the encoding is 00100111

If "Two X's" and 5T=01001 and T1 and T3 are X, then the encoding is 10011001

If "Four X's" and 5T=10101 and T3 is not X, then the encoding is 111101X

Example 5T-to-Binary Encoder with 256 Binary States:

Row 32 represent encoder logic to encode on a 5T value on the condition that all 5T values are X values in a 5T value being encoded. A combination of six (6) mapping bits occupies columns 1-6, and no binary data values occupy either of rows columns 7-8 in row 32.

Row 1 of the example encoder logic table represents thirty-two possible 5T value states since the five data bits represented in the first row can have $2^5=32$ possible states.

Rows 2-6 of the example encoder logic table represent eighty possible states. Each of the rows 2-6 can have $2^4=16$ states, and 16*5=80.

Rows 7-16 represent eighty possible states. Each of rows 7-16 can have $2^3=8$ possible states, and 8*10=80.

Rows 17-26 represent forty possible states. Each of rows 17-26 can have $2^2=4$ states, and 4*10=40.

Rows 27-31 represent twenty possible states. Each of the five rows 27-31 can have four states. The one binary data bit in each row can has two possible states and the one X value in each row can have any of two states, and 4*5=20.

Row 32 represents four possible states. Each of the two X values in row 32 has two possible states, which results in 4 possible states for row 32.

Thus, the encoder logic encodes 32+80+80+40+20+4=256 possible states.

Example 5T-to-Binary Encoder with 243 Binary States:

A second example encoder logic (not shown), which encodes only 243 states, can be used to encode a 5T value to eight encoding bits.

The second encoder logic is summarized as follows.

On a condition that a 5T value to be encoded has no X values, use three mapping bits and five binary data bits, which provides 32 possible states all together.

On a condition that a 5T value to be encoded has one X value, use four mapping bits and four binary data bits, which provides 5*16=80 possible states all together.

On a condition that a 5T value to be encoded has two X values, use five mapping bits and three binary data bits, which provides 10*8=80 possible states all together.

On a condition that a 5T value to be encoded has three X values, use six control bits and two binary data bits, which provides 10*4=40 possible states all together.

On a condition that a 5T value to be encoded has four X values, use seven control bits and one binary data bit, which provides 5*2=10 possible states all together.

On a condition that a 5T value to be encoded has five X values, use eight mapping bits, which provides one possible state.

Thus, the second encoder logic provides 32+80+80+40+10+1=243 states, which exactly matches the number of possible states of a 5T value.

The second encoder logic is more efficient than the first encoding logic in the sense that the second encoder logic encodes a smaller number of states that exactly matches the number of states required to represent all possible $3^5=243$ combinations of 5T sequences. However, the second encoder logic is less efficient in terms of hardware and/or computing resources since the second example encoder logic requires a total of eight mapping bits whereas the first example encoder, illustrated with reference to Table 2, requires only six mapping bits.

The above description is presented to enable any person skilled in the art to make and use an algorithmic ternary content addressable memory with compressed key encoding. Various modifications to the examples will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A ternary content addressable memory comprising:
an interface to receive a ternary key;
an integrated circuit memory device that includes a plurality of memory address locations;
hash logic operative to determine a hash value, based upon the ternary key, that corresponds to a memory address location of the memory device;
an encoder to convert a ternary key to a binary bit representation, wherein the ternary key includes at least five ternary value bits, by performing operations that include:
determining binary mapping bits based upon number and positions of ternary non-X (don't care) value bits of the ternary key; and
determining a different binary data bit to correspond to each different ternary non-X value bit of the ternary key, wherein each determined binary data bit has a logic value that matches a logic value of the ternary value bit to which the determined binary data bit corresponds; and
memory controller logic to cause the memory device to store the binary bit representation at the memory address location that corresponds to the determined hash value.

2. The ternary content addressable memory of claim 1, wherein the determining binary mapping further include determining a distinct binary bit position for each different binary data bit determined to correspond to a ternary non-X value bit.

3. The ternary content addressable memory of claim 1, wherein the determining binary mapping further include determining an ordering of binary data bits in the binary data representation that matches an ordering of determined corresponding ternary non-X value bits in the ternary key.

4. The ternary content addressable memory of claim 1, wherein the operations further include arranging the binary mapping bits in mapping bits field and arranging the binary data bits in a data bits field.

5. The ternary content addressable memory of claim 1, wherein the operations further include arranging the binary bit representation in a fixed size field that includes a binary mapping bits field and a data bits field.

6. A ternary content addressable memory comprising:
an interface to receive a ternary keys;
a memory device that includes a plurality of memory address locations;
wherein the memory device stores, at a first memory address location, an encoded key that includes three or more binary value mapping bits that indicate position and number of ternary non-X (don't care) value bits within a previous ternary key and that includes zero or more binary value data bits that each corresponds to and matches a logical value of a different ternary non-X value bit of the previous ternary value;
hash logic operative to determine hash values based upon the received ternary keys, wherein the hash values correspond to memory address locations of the memory device;
memory controller logic to cause the memory device to output the encoded key from the memory address location in response to a hash value determined based upon a later ternary key, on a condition that the determined hash value corresponds to the first memory location;
a decoder to determine correspondences between the non-X ternary value bits in the later ternary key and the binary value data bits in the outputted binary encoded key, based upon the binary value mapping bits in the binary encoded key;
a comparator operable to compare the non-X ternary value bits in the later ternary key with binary value data bits determined to correspond to the non-X ternary value bits in the later ternary key and to provide one or more comparator results.

7. The ternary content addressable memory of claim 6, wherein the binary mapping bits are arranged in a mapping bits field in the first memory address location and the binary data bits are arranged in a data bits field in the first memory address location.

8. The ternary content addressable memory of claim 6, wherein the binary bit representation is arranged in a fixed size field in the first memory address location that includes a binary mapping bits field and a data bits field.

9. The ternary content addressable memory of claim 6, wherein the an ordering of binary data bits in the binary data representation in the first memory address location matches an ordering of determined corresponding ternary non-X value bits in the ternary key.

10. The ternary content addressable memory of claim 6 further including:
a logic circuit to indicate whether the received ternary key matches the previous ternary key based upon the one or more comparator results.

11. The ternary content addressable memory of claim 6, wherein the memory device stores rule information at the first memory address location;
wherein the memory controller logic to cause the memory device to output the rule information from the first memory address location in response to the hash value is determined based upon the later ternary key;
a logic circuit to send a signal indicating selection of the outputted rule information based upon the one or more comparator results indicating a match between each of the non-X ternary value bits in the later ternary key and the binary value data bits determined to correspond to the non-X ternary value bits in the later ternary key.

12. A method to control a ternary content addressable memory that includes a memory device that includes a plurality of memory address locations, comprising:
- receiving a ternary key;
- determining a hash value based upon the received ternary key, wherein the hash value corresponds to a memory address location of the memory device;
- converting the received ternary key to a binary bit representation, wherein the ternary key includes at least five ternary value bits, by:
  - determining binary mapping bits based upon number and positions of ternary non-X (don't care) value bits of the ternary key; and
  - determining a different binary data bit to correspond to each different ternary non-X value bit of the ternary key, wherein each determined binary data bit has a logic value that matches a logic value of the ternary value bit to which the determined binary data bit corresponds; and
- causing the memory device to store the binary bit representation at the memory address location that corresponds to the determined hash value.

13. The method of claim 12 further including:
- wherein determining binary mapping further ordering of binary data bits in the binary data representation that matches an ordering of determined corresponding ternary non-X value bits in the ternary key.

14. A method to control a ternary content addressable memory that includes a memory device that includes a plurality of memory address locations, comprising:
- storing at a first memory address location, an encoded key that includes three or more binary value mapping bits that indicate position and number of ternary non-X (don't care) value bits within a previous ternary key and that includes zero or more binary value data bits that each corresponds to and matches a logical value of a different ternary non-X value bit of the previous ternary value;
- determining a hash value based upon a later ternary key;
- outputting the encoded key from the memory address location in response to the hash value on a condition that the determined hash value corresponds to the first memory address location;
- determining correspondences between the non-X ternary value bits in the later ternary key and the binary value data bits in the outputted binary encoded key, based upon the binary value mapping bits in the binary encoded key;
- determining whether the non-X ternary value bits in the later ternary key match binary value data bits determined to correspond to the non-X ternary value bits in the later ternary key.

15. The method of claim 14 further including:
- storing rule information at the first memory address location;
- outputting the rule information from the first memory address location in response to the hash value determined based upon a later ternary key; and
- sending a signal indicating selection of the outputted rule information based upon a determination of a match between the non-X ternary value bits in the later ternary key and the binary value data bits determined to correspond to the non-X ternary value bits in the later ternary key.

* * * * *

UNITED STATES PATENT AND TRADEMARK OFFICE
CERTIFICATE OF CORRECTION

| | | |
|---|---|---|
| PATENT NO. | : 11,720,492 B1 | |
| APPLICATION NO. | : 17/710678 | |
| DATED | : August 8, 2023 | |
| INVENTOR(S) | : Syed et al. | |

It is certified that error appears in the above-identified patent and that said Letters Patent is hereby corrected as shown below:

On the Title Page

On page 2, in Column 2, under Item (56) "Other Publications", Line 4, delete "Memcry" and insert --Memory-- therefor In the Claims In Column 12, Line 2, in Claim 6, before "ternary", delete "a"

Signed and Sealed this
Third Day of October, 2023

Katherine Kelly Vidal
*Director of the United States Patent and Trademark Office*